June 10, 1941.                T. W. MULLEN                2,245,355
                              TIRE BALANCING
                           Filed May 23, 1938
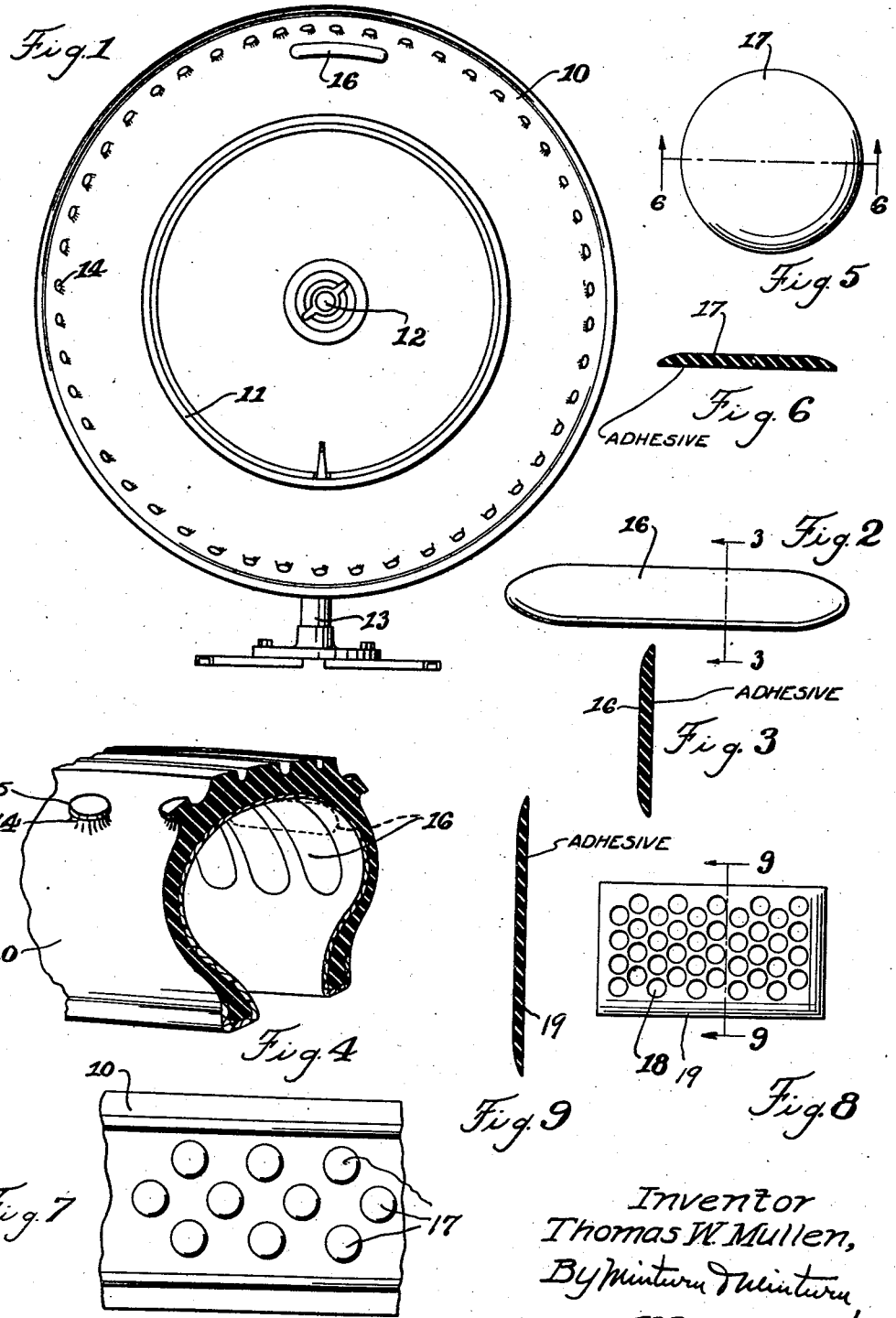

Patented June 10, 1941

2,245,355

UNITED STATES PATENT OFFICE 2,245,355

TIRE BALANCING

Thomas W. Mullen, Indianapolis, Ind.

Application May 23, 1938, Serial No. 209,488

6 Claims. (Cl. 154—14)

This invention relates to means for balancing a tire and has for a primary object the provision of means whereby a combined casing and tube or a casing alone may be placed in balance. I am aware of the fact that it has been customary heretofore to balance the combination of a wheel and a tire by means of slipping weights over the edge of the tire rim or applying weights to the spokes of wire wheels and the like. The difficulty with this method of balancing is that the balancing weights are removed inwardly quite a distance from the periphery of the tire itself which is generally in the zone of the "unbalance." In other words, when the tire is traveling at a high rate of speed, the original balance obtained by placing weights on the rim do not take care of the unbalance of the casing itself which causes a great degree of distortion at such speeds. Furthermore, by the method of applying weights in a slipped on manner, there has always been the possibility of such weights flying off at high speeds.

It is a further primary object of my invention to provide means for balancing the casing which may not only be readily applied and become a permanent feature of the casing but may be had at extremely low cost, without exercise of any great degree of skill in securing the balance desired.

These and other objects and advantages of the invention will become apparent to those versed in the art in the following description of the invention which is made in reference to the accompanying drawing, in which Fig. 1 is a front elevation of a casing mounted on a stand for balancing;

Fig. 2, a plan view of a casing balance weight;

Fig. 3, an enlarged transverse section on the line 3—3 in Fig. 2;

Fig. 4, a detail in perspective of a section of a casing to which the invention has been applied;

Fig. 5, a plan view of a modified form of the casing weight;

Fig. 6, a transverse section on the line 6—6 in Fig. 5;

Fig. 7, a bottom plan view of a fragment of a casing to which the weights of the form of Fig. 5 have been applied;

Fig. 8, a plan view of a still further modified form of weight; and

Fig. 9, an enlarged transverse section on the line 9—9 in Fig. 8.

Like characters of reference indicate like parts throughout the several views in the drawing.

The invention primarily consists in adding to or removing from the casing rubber masses which are preferably made of a heavier type of rubber than is used in forming the wall and treads of the casing, the purpose of the additional loading being to obtain that additional weight. Referring first to Figs. 1 and 4, the casing and preferably the inner tube also placed within the casing 10, are mounted upon any suitable balancing means, herein shown as a cylindrical band 11 rotatably carried on an axle 12 supported by a stand 13, the specific details of the balancing means not entering into the present invention. When the heavy side of the casing or the combined casing and tube is located, the casing must then be compensated for such degree of unbalance.

In the form shown in Figs. 1 and 4, the casing is provided during the process of its manufacture with a plurality of protuberances 14 preferably arranged adjacent the tread of the tire on either side thereof, as best indicated in Fig. 4. These protuberances or bosses 14 are preferably made of a heavier type rubber than the rubber in the balance of the casing. When the heavy side of the casing is located by means of the balancing device, one or more of these bosses 14 on each side of the tread is cut or trimmed off until the casing is brought into balance.

Generally the heavy part of the casing which causes the unbalance is distributed over an appreciable area and, therefore, it is preferable to trim off parts or all of those bosses 14 as may be required over an area or length of the casing rather than trying to make the correction with a single boss removal. For the sake of convenience, these bosses may have an annular ring 15 therearound for the guidance of a knife when they are to be cut off. This means of correcting the unbalance of the casing is employed only when the casing is originally manufactured with the bosses for removal.

For such casing already manufactured without the bosses, other means are employed. One such means will take the form of a rubber weight 16, such as is indicated in Figs. 2 and 3, where the weight is shown to consist essentially of an elongated thin strip of rubber with beveled edges and with the flat face provided with a suitable adhesive for causing the weight to adhere to the wall of the casing when applied thereto. In using this type of balancing means, the casing is placed on a balancing device as above indicated and the heavy side located. The heavy side will, of course, be on the extreme underside when the casing comes to rest and, therefore, to correct for that condition, one or more of the weights must be applied to the side of the casing diametrically opposite the heavy side. The weights are applied one at a time to the outer side of the casing as indicated by the single weight 16 in Fig. 1, until the casing is brought into balance. The weights stick to the outer wall of the casing by reason of the presence of the adhesive. These weights are preferably placed as near the tread as possible. Then when the casing is brought into balance by the addition of these or additional weights as may be required, the casing is removed from the balancing device, the position of the valve stem marked on the casing, the inner tube removed, and then a like number of identical sizes of weights 16 are placed in position on the inside of the casing, as indicated in Fig. 4. Preferably the weights are placed transversely across the inner side of the casing, as indicated by the solid lines, but where only a limited number of weights are required they may be placed longitudinally, as indicated by the dash line.

In reference to the weights 16, an important characteristic of such a weight as well as any other weight employed for the like purpose is that the weight be thin and of relatively small area in order that heat may be dissipated readily and not allowed to build up as would be the case where a weight of appreciable thickness and area would be employed. The question of heat dissipation is extremely important. Furthermore, the weights, while being made out of rubber so as to permit flexing with the casing wall, are well loaded with any suitable material such as is commonly employed in the art of making rubber goods so that the weights may be made up in sizes running, for example, from a half ounce, one ounce, and so on up to several ounces in combined weights.

The weights may also take the form as shown by the weights 17 in Figs. 5-7, here shown as being in the form of thin circular wafers also carrying an adhesive coating. The advantage of these circular formed weights is that a plurality may be employed with good heat dissipation, the weights being applied somewhat as shown in Fig. 7 in spaced apart relation on the inner, lighter side of the casing.

A still further possible form of weight is that shown in Figs. 8 and 9 which may be simply a thin sheet of rubber 19 carrying an adhesive coat to be applied on the inner side of the casing, or this form may be still further modified by providing a plurality of holes 18 therethrough in order to prevent the maintaining of a heated condition. In any event, regardless of which form of weight is employed, as above indicated, it is always desirable to apply the weights over an appreciable area on the light side of the casing in order to prevent undue distortion of the casing at high speeds as would otherwise result should the weights be concentrated within a limited zone.

While I have herein shown and described my invention in the best forms as are now known to me, it is obvious that structural variations may be used without departing from the spirit of the invention, and I, therefore, do not desire to be limited to those precise forms beyond the limitations as may be imposed by the following claims.

I claim:

1. For balancing a tire having a heavy side, a tire casing, a close assembly of a plurality of flexible weights formed to be yieldingly secured to the inner side of the tire casing and having a spaced apart structure arranged and limited to dissipate heat of internal friction during use.

2. For balancing a tire having a heavy side, a tire casing, a close assembly of a plurality of flexible weights formed to be yieldingly secured to the tire casing and having a shape arranged and limited to dissipate heat of internal friction during use, said weight being integrally formed on the wall of the tire casing in multiple spaced apart arrangement close to the tread around the casing as rubber bosses extending therefrom and arranged for severance over that heavy side.

3. For balancing a tire having a heavy side, a tire casing, a close assembly of a plurality of flexible weights formed to be yieldingly secured to the tire casing and having a shape arranged and limited to dissipate heat of internal friction during use, said weight being integrally formed on the wall of the tire casing in multiple spaced apart arrangement close to the tread around the casing as rubber bosses extending therefrom and arranged for severance over that heavy side, each of said bosses being of heavier type of rubber than that of the rubber of the casing wall.

4. That method of balancing a tire which comprises locating the heavy side of the tire while on a balancing device, placing a flexible weight on the outside of the tire casing by adhesive on the light side sufficient to bring the casing into balance, removing the casing from the balancing device and placing a weight in a plurality of separate separated units on the inside of the casing equal to the outside weight and securing the weight inside by adhesive, and then removing the outside weight.

5. The method of balancing overbalanced tire casings which comprises applying a thin layer of preformed material of uniform thickness throughout except thinned at the edges to the interior surface of the light side of the casing in an amount substantially equal in weight to that of the overbalance of said casing.

6. The method of balancing overbalanced tire casings which comprises adhering a thin layer of preformed material of uniform thickness throughout except thinned at the edges to the interior surface of the light side of the casing at the periphery thereof in an amount substantially equal in weight to that of the overbalance of said casing.

THOMAS W. MULLEN.